Aug. 28, 1923.

LA FAYETTE T. GUY

FISHING TACKLE

Filed Aug. 29, 1921

1,466,620

R. G. Thomas

WITNESSES

L. T. Guy
INVENTOR

BY Victor J. Evans
ATTORNEY

Patented Aug. 28, 1923.

1,466,620

UNITED STATES PATENT OFFICE.

LA FAYETTE T. GUY, OF SELMA, ALABAMA.

FISHING TACKLE.

Application filed August 29, 1921. Serial No. 496,381.

*To all whom it may concern:*

Be it known that I, LA FAYETTE T. GUY, a citizen of the United States, residing at Selma, in the county of Dallas and State of Alabama, have invented new and useful Improvements in Fishing Tackle, of which the following is a specification.

This invention relates to fishing tackle, the principal object of the invention being to provide spring actuated grab hooks for catching the fish when it attempts to take the bait.

Another object of the invention is to provide a perforated casing for carrying the working parts and for sinking the device, said casing being so made as to attract the fish.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
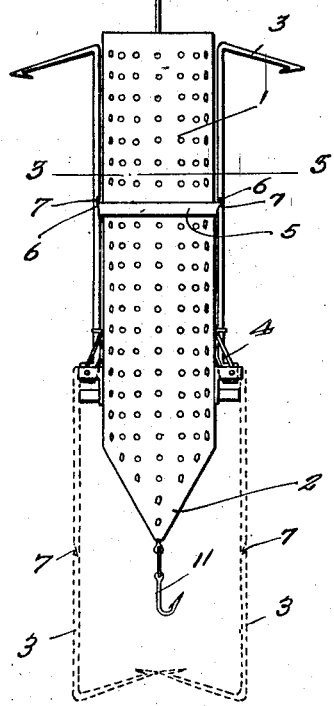
Figure 1 is an elevation of the invention.
Figure 2:
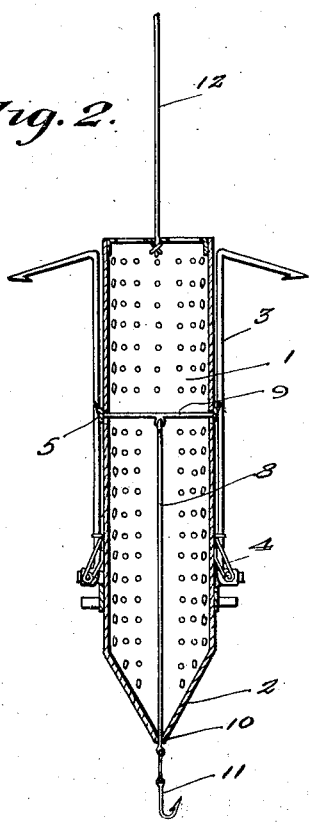
Figure 2 is a longitudinal sectional view.
Figure 3:
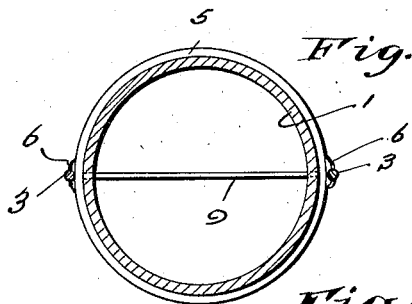
Figure 3 is an enlarged sectional view taken on line 3—3 of Figure 1.
Figure 4:
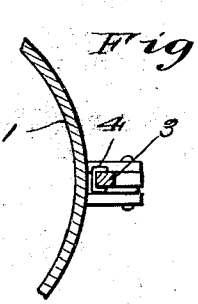
Figures 4 and 5 are detail views.
Figure 5:
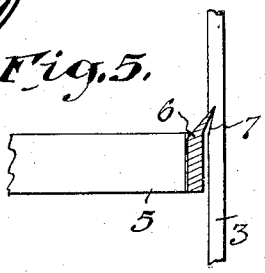

In these views 1 indicates a perforated casing, preferably made of metal, so that it will sink in the water by its own weight. The casing is provided with numerous perforations to make it of the minimum weight. The casing is made of the shape shown and is polished so as to attract the fish. The lower end of the casing is pointed, as at 2. Grab hooks 3 are pivotally secured to said casing adjacent its lower end, springs 4 being provided for normally holding the hooks in their lower or operative position. The drawing shows a pair of hooks, diametrically arranged, though sometimes it may be desirable to use two pairs of hooks, the hooks of each pair being arranged opposite to each other. A ring 5 has limited sliding movement on the casing and this ring is provided with the lips 6 for engaging the notches 7 in the hooks for holding said hooks in their upper positions and against the action of the springs. A flexible member 8 has its upper end connected with the cross bar 9 which is secured to the ring and passes through the casing and this flexible member passes downwardly through the casing and through a hole 10 in the pointed end of the casing where it is connected with a bait hook 11. The fishing line 12 is secured to the upper end of the casing.

In using the device the grab hooks 3 are swung upwardly and the lips 6 of the ring 5 are placed in engagement with the notches 7 to hold the hooks in their upper positions with the springs contracted. The ring is then in its upper position. The bait is placed on the hook 11 and then the device tossed into the water. When a fish seizes the baited hook 11 and attempts to get away the ring 5 will be jerked downwardly so as to withdraw the lips 6 from the notches 7 and thus release the hooks 3. The springs of these hooks will cause them to swing downwardly with considerable force so that their pointed ends will impale the fish and thus permit it to be withdrawn from the water with the device.

The four hooks are used in fishing for large sized fish.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A fishing tackle of the class described including a perforated polished metallic casing having a flat upper surface and a V-shaped lower extremity, a pair of diametrically arranged grab hooks pivotally secured to said casing and adjacent its lower end thereof, a spring provided for each hook and adapted to normally hold said hooks in an operative position, a ring surrounding the casing intermediate of its ends and having a limited sliding movement thereon, a lip formed on opposing sides of said ring and adapted to normally engage a notch provided on each hook for holding said hook in an inoperative position, a bar transversely arranged through the casing and secured to said ring, a flexible member having its upper end secured to said bar and its lower end passing through and beyond the apex of the V-shaped lower extremity of said casing and a hook secured to the last mentioned end of said flexible member as and for the purpose specified.

In testimony whereof I affix my signature.

LA FAYETTE T. GUY.